United States Patent
Kane et al.

[15] 3,668,166
[45] June 6, 1972

[54] POLYVINYL ALCOHOL ADHESIVES

[72] Inventors: Thomas G. Kane; William D. Robinson, both of Wilmington, Del.

[73] Assignee: E. I. du Pont de Nemours and Company, Wilmington, Del.

[22] Filed: Feb. 25, 1970

[21] Appl. No.: 14,099

[52] U.S. Cl.................260/29.6 BM, 117/155 UA, 161/250, 260/91.3 PV
[51] Int. Cl. .......................................................C08f 29/26
[58] Field of Search...........................260/91.3 PV, 29.6 BM

[56] References Cited

UNITED STATES PATENTS

| | | | |
|---|---|---|---|
| 3,087,920 | 4/1963 | Suzumura et al. | 260/91.3 |
| 3,320,200 | 5/1967 | Kane | 260/29.6 |

OTHER PUBLICATIONS

Matsumoto, J. Polym. Sci. 31, 225– 226 (1958)
Beresniewics, J. Polym. Sci. 39, 67– 68 (1959)
Tsunemitsu et al., S.C.I. Monograp No. 30, 115, 119– 120 (1968)
Argana et al., in Water Soluble Resin (Davidson et al., Ed.), Reinhold, New York 1962, pp. 109– 110, 112, 118.
Colgan et al., TAPPI Monograph Series No. 25, 117– 128 (1963)
Richardson, TAPPI Monograph Series No. 28, 57– 60 (1964)

*Primary Examiner*—Melvin Goldstein
*Attorney*—Ivan G. Szanto

[57] ABSTRACT

The invention relates to polyvinyl alcohol compositions and aqueous adhesives formed therefrom which are characterized by improved rheological properties. The employment of polyvinyl alcohol having a 4 percent aqueous solution viscosity in the range of about 1 to 16 centipoises in aqueous tackified adhesive systems provides significant and unexpected improvement in flow properties.

14 Claims, 2 Drawing Figures

3,668,166

POLYVINYL ALCOHOL ADHESIVES

BACKGROUND OF THE INVENTION

1. Field of the Invention

This invention relates to polyvinyl alcohol adhesive compositions and particularly, to polyvinyl alcohol compositions adapted to form aqueous adhesives characterized by improved rheological properties. More particularly, the invention relates to the use of these adhesives for joining cellulosic structures and to articles comprising cellulosic structures joined by these adhesives.

2. Description of the Prior Art

The structure and preparation of polyvinyl alcohol are well known and extensive applications of this versatile resin are described in the literature, for example, "Polyvinyl Alcohol" by Norbert Platzer, Modern Plastics, pp. 95ff (March 1951). A particular application for which polyvinyl alcohol is well suited and for which the present invention is essentially adapted comprises the formulation of adhesives. In this regard, it is known that in unmodified form, e.g., simple aqueous solutions of polyvinyl alcohol, polyvinyl alcohol is not very suitable for many adhesive applications and in particular, those applications requiring high wet tack, i.e., high bond strength while the adhesive is still wet and before the moisture of the adhesive formulation has been absorbed by the substrate or has evaporated.

Modified polyvinyl alcohol adhesives are also known to the art and have been developed to provide improved wet tack. Hawkins, U.S. Pat. No. 3,135,648, discloses that polyvinyl alcohol adhesives having good wet tack may be prepared from aqueous solutions of polyvinyl alcohol by the addition thereto of a water-soluble boron compound and an amount of an acid such that the pH of the adhesive is below 5.5. Hawkins teaches that the boron compound must be in the range of about 4 to about 15 percent by weight of the polyvinyl alcohol if the desired improvement in wet tack is to be obtained.

Polyvinyl alcohol adhesive formulations have also been developed to provide improvements in "quick tack" or "green strength", i.e., the property or capability of effecting substantially instantaneous bonding between contacted substrates. Kane, U.S. Pat. No. 3,320,200, discloses that the addition of boric acid together with hexamethylenetetramine, triethylenediamine or mixtures thereof to aqueous solutions of polyvinyl alcohol readily imparts quick tack to such adhesive formulations. The Kane patent teaches that the boric acid addition is in the range of 1 to 7 percent by weight of the polyvinyl alcohol and that the amino compound addition is in the range of 0.7 to 12 percent by weight of the boric acid.

While the polyvinyl alcohol adhesives of the prior art have shown continued improvement in many properties and such improvement has broadened their acceptance for use in industrial adhesive applications, for example, in the manufacture of solid fiberboard, liner board, spiral-wound tubes and drums, and laminated specialties, the improvement in rheological properties of such adhesives has not kept pace with the improved capability of high speed machinery and equipment in the industry. In the economical operation of such machinery and equipment, adhesives are applied to cellulosic substrates at very high shear rates, the limits thereof being essentially determined by the occurrence of dilatant flow, i.e., increase of viscosity with increase in shear rate. The dilatancy is evidenced by a thickening of the adhesive with increased shear rate and is undesirable because of the resultant non-uniformity or loss in adhesive properties.

Accordingly, there is a pressing need for polyvinyl alcohol adhesives which exhibit improved rheological properties and which are capable of behaving as a pseudoplastic system, i.e., decrease in viscosity with increase in shear rate, at very high shear rates.

SUMMARY OF THE INVENTION aqueous centipoises a. The invention is directed to a dry blend adapted to form with water an adhesive characterized by pseudoplastic flow at shear rates of $10^2$ to at least about $10^4$ sec.$^{-1}$, said dry blend comprising water-soluble polyvinyl alcohol characterized by a degree of hydrolysis in the range of about 85 to 100 percent and by a 4 percent aqueous solution viscosity at 20° C. in the range of about 9 to 16 centipoises and a water-soluble boron compound from an amount effective to improve wet tack of said adhesive to an amount less than that at which gelling occurs.

b. The invention is further directed to a dry blend adapted to form with water an adhesive characterized by pseudoplastic flow at shear rates of $10^2$ to at least about $10^4$ sec.$^{-1}$, said dry blend comprising water-soluble polyvinyl alcohol characterized by a degree of hydrolysis in the range of about 85 to 100 percent and by a 4 percent aqueous solution viscosity at 20° C. in the range of about 9 to 16 centipoises, a water-soluble boron compound from an amount effective to improve wet tack of said adhesive to an amount less than that at which gelling occurs, and a member of the group consisting of hexamethylenetetramine, triethylenediamine and mixtures thereof, from an amount effective to improve quick tack of said adhesive to an amount less than that at which gelling occurs.

c. The invention also contemplates a polyvinyl alcohol adhesive characterized by pseudoplastic flow at shear rates of $10^2$ to at least $10^4$ sec.$^{-1}$ and comprising an aqueous solution of the polyvinyl alcohol blends of (a) or (b).

d. The invention further contemplates a polyvinyl alcohol adhesive characterized by pseudoplastic flow at shear rates of $10^2$ to at least about $10^4$ sec.$^{-1}$ and comprising an aqueous solution of the polyvinyl alcohol blends of (a) or (b), wherein said adhesive includes clay filler in an amount compatible with pseudoplastic flow.

e. Another embodiment of the invention relates to an improvement in a method of joining cellulosic structures comprising applying a film of an adhesive to a surface of a first cellulosic structure, placing the surface of a second cellulosic structure in contact with the applied film of adhesive, and applying pressure to join together said first and second cellulosic structures, wherein the improvement resides in the use of the adhesive of (c) or (d).

f. Still another embodiment of the invention relates to a joined cellulosic structure comprising at least two component parts, the surfaces of which are adhesively united through a dried down film of the adhesive of (c) or (d).

The invention is based in part on the concept that transition from pseudoplastic to dilatant flow of aqueous polyvinyl alcohol adhesives may be extended to higher shear rates by employing a polyvinyl alcohol which is characterized by a critical 4 percent aqueous solution viscosity at 20° C. within the range of 9 to 16 centipoises.

The inventive concept extends to the use of increased solids contents in aqueous adhesives comprising polyvinyl alcohol which is characterized by a critical 4 percent aqueous solution viscosity at 20° C. within the range of 9 to 16 centipoises.

DESCRIPTION OF THE INVENTION

Polyvinyl Alcohol

Figure 1:
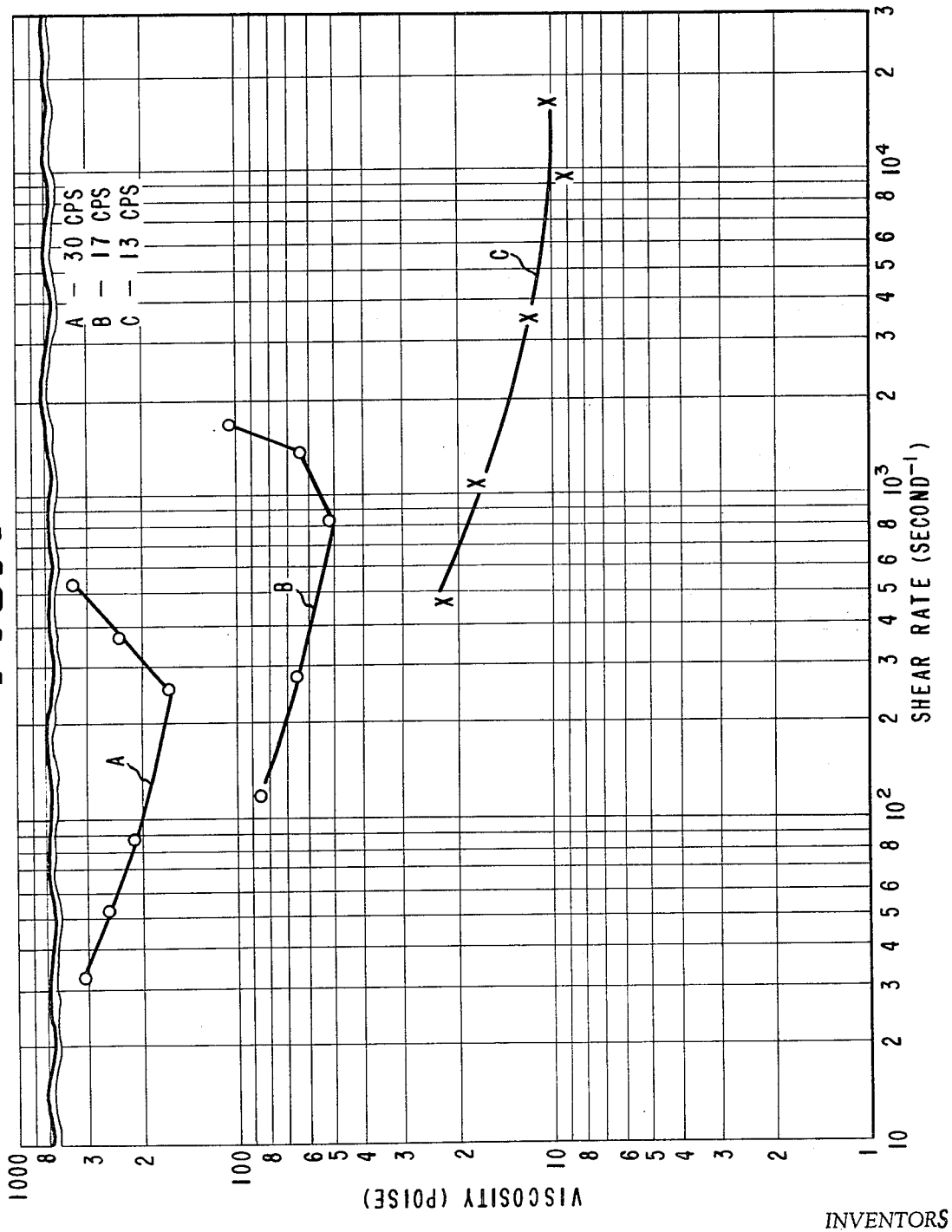
FIG. 1 is a log-log plot of capillary viscometric measurements on clay extended polyvinyl alcohol adhesives.

As is well known, polyvinyl alcohol is prepared by the alcoholysis, saponification or hydrolysis of a polyvinyl ester such as polyvinyl acetate, so as to convert at least about 70 percent of the ester groups of the latter to hydroxyl groups. The extent to which such conversion is effected is commonly referred to as the degree of hydrolysis, which is frequently expressed as percent hydrolysis. A polyvinyl alcohol that is 99 to 100 percent hydrolyzed, i.e., 99 to 100 percent of the ester groups are converted to hydroxyl groups, is generally referred to as a fully hydrolyzed polyvinyl alcohol, while one that is hydrolyzed to a lesser extent is referred to as a partially hydrolyzed polyvinyl alcohol. Polyvinyl alcohols of various degrees of hydrolysis are available commercially in high, medium and low viscosity grades. The viscosity of a polyvinyl alcohol depends upon the degree of polymerization of the polyvinyl ester from which it was derived (the higher the degree of polymerization of the parent ester, the higher will be the viscosity of the polyvinyl alcohol).

Generally speaking, any of the commercially available polyvinyl alcohols, i.e., the high, low and medium viscosity grades of fully hydrolyzed and partially hydrolyzed polyvinyl alcohols, can be employed in the formulation of aqueous polyvinyl alcohol adhesives. While the prior art generally recognizes that specific applications might call for a particular viscosity grade or a particular degree of hydrolysis, there is no clear teaching with respect to adhesive applications involving very high shear rates. The Hawkins patent, infra, states that "it is possible to select a desired viscosity polyvinyl alcohol for a specific application; however, any polyvinyl alcohol having a viscosity of 2 to 150 centipoises in a 4 percent aqueous solution at 20° C. is generally acceptable." A more specific teaching in this regard is found in the Kane patent, infra, wherein it is stated "the polyvinyl alcohols that are preferred, particularly for preparing adhesives for use in a high speed corrugating machine, are the completely hydrolyzed (99 to 100 percent), medium viscosity grades, the viscosities of which range from about 15 to 60 centipoises."

The polyvinyl alcohols of the present invention are characterized by a degree of hydrolysis in the range of about 85 to 100 percent and, in particular, by a 4 percent aqueous solution viscosity at 20° C. in the very narrow range of about 9 to 16 centipoises, preferably between 12 and 14 centipoises. It has been found that polyvinyl alcohols with these characteristics can be employed in tackified adhesive systems to achieve unexpected advantages in rheological properties. In particular, the tackified polyvinyl alcohols of the invention can be employed in aqueous solution to provide adhesives characterized by pseudoplastic flow at shear rates of $10^2$ to at least about $10^4$ sec.$^{-1}$. These high shear values evidence a significant upward shift for transition from pseudoplastic to dilatant flow, which shift is wholly unexpected. The significance thereof becomes even more apparent in the light of the observation that such shift is at no expense to wet grab or tackiness. It is, of course, obvious that the improved rheological properties can be translated into broader polyvinyl alcohol adhesive applications, as in tube winding, can manufacture, single facer corrugating, and case and carton sealing. In addition, since dilatancy is a function of the solids content of an adhesive; it is equally obvious that use of the tackified polyvinyl alcohol of the invention permits employment of higher solids contents reflecting economies in joining operations as well as improvements in the quality of the product.

The adhesives of the invention comprise aqueous solutions containing about 4 to 20 percent tackified polyvinyl alcohol, based upon the combined weights of the water and polyvinyl alcohol components. Tackified polyvinyl alcohol concentrations of at least about 4 percent are generally required to develop the desired adhesive properties while concentrations higher than about 20 percent generally yield solutions which are too viscous for practical use. The preferred adhesives will contain 5 to 12 percent tackified polyvinyl alcohol, on the basis indicated above.

In general, the pH of the inventive adhesives is not critical and adjustment of the pH below a particular value, e.g., a pH of 5.5 as taught by Hawkins, infra, is not necessary to obtain basic and novel characteristics of the invention. Accordingly, the inventive adhesives may have a pH above or below 5.5.

Adhesive Modifiers

The present invention contemplates the employment of modifying agents for improving certain adhesive properties. Essentially, water-soluble boron compounds are added to the adhesives of the invention for the purpose of improving wet tack. Examples of some suitable water-soluble boron compounds are borax, sodium metaborate, sodium pentaborate, boric acid and disodium octaborate tetrahydrate. The amount of water-soluble boron compound which may be employed will depend to some extent on the application for which the adhesive is to be used and upon the form of boron compound which is employed. In general, the boron compound may be employed from an amount effective to improve wet tack of the adhesive to an amount less than that at which gelling occurs, a preferred range being about 4 to about 15 percent, based on the weight of polyvinyl alcohol.

As indicated, the employment of a water-soluble boron compound is essential in the practice of the invention for the purpose of obtaining desired wet tack properties. However, the degree of wet tack may be varied to some extent by pH adjustment as indicated by Hawkins, infra. The pH of the adhesive of the present invention may be controlled by the use of any water-soluble acid or acid salt. Examples of suitable water-soluble acids are hydrochloric acid, acetic acid, formic acid and phosphoric acid, although other acids may be employed. If a dry blend is to be formed, it is desirable to employ a dry acid such as citric acid, oxalic acid or sulfamic acid. Maleic and fumaric acids as well as maleic anhydride may also be employed for controlling the pH, although the toxic nature of maleic acid and maleic anhydride might be a limiting factor for certain applications.

The invention also contemplates as an adhesive modifier the essential employment of a member of the group of hexamethylenetetramine, triethylenediamine or mixtures thereof. When such combination is employed the boric acid may be present in an amount equal to about 1 to 15 percent, preferably 2 to 10 percent, based upon the weight of the polyvinyl alcohol. Amounts less than 1 percent are generally insufficient to develop significant improvement in the tackiness of the adhesives, while amounts greater than about 15 percent generally cause undesired synersis, although the absolute permissible maximum in any given instance will depend somewhat upon the particular polyvinyl alcohol employed and its concentration in the adhesive.

The hexamethylenetetramine, triethylenediamine, or mixtures thereof, desirably is employed in an amount equal to 0.7 to 12 percent, preferably 3 to 7 percent, based upon the weight of the boric acid used. The function of these agents is to improve the tackifying action of the boric acid. Amounts thereof less than about 0.7 percent of the boric acid are generally insufficient to impart significant improvement in this respect, while amounts greater than about 12 percent generally increase the viscosity of the adhesive excessively or result in gelation of the polyvinyl alcohol.

The most preferred adhesives of the invention will also include a filler such as clay, although clay is not to be regarded as an essential component. However, the inclusion of clay is desirable for many uses, particularly where rapid or instantaneous adhesion is desired, as in the single-facer of a corrugating machine, and where inhibition of penetration into the substrate is desired. The addition of relatively cheap clay is also desirable, for economic reasons. When used, the clay will generally be added in amounts of from 20 to 700 percent, based upon the weight of polyvinyl alcohol. The preferred amounts generally range from 200 to 400 percent. Clays of the kaolinite type are generally preferred. Commercially available clays of this type include ASP 100 and ASP 200, which are finely divided grades; ASP 400, a relatively coarse grade; and ASP 600, which is a medium particle size grade. Such clays are commonly used as fillers in polyvinyl alcohol adhesives.

EXAMPLES

The following examples are illustrative of the present invention.

EXAMPLE 1

Polyvinyl alcohol characterized by a degree of hydrolysis of about 99 percent and by a 4 percent aqueous solution viscosity at 20° C. of about 13 centipoises was mixed with boric acid (U.S.P. grade) and hexamethylenetetramine (99 percent purity) to form a dry blend composed of 3.74 lbs. (1,698 grams) polyvinyl alcohol, 0.205 lb. (93.1 grams) boric acid, and 0.0123 lb. (5.58 grams) hexamethylenetetramine. Water amounting to 30.8 lbs. was weighed into a tared 5 gallon pail (including weight of stirrer in tare) and 9.24 lb. ASP 600 clay (pH = 3.8) was added thereto with stirring, followed by all of the prepared polyvinyl alcohol dry blend. The mixture was then heated in a water bath at 200° F. for at least 1 hour, followed by cooling to about 120° F. while stirring. The pail together with its contents was then reweighed and the weight was adjusted for evaporation losses. Viscosity measurements taken at various temperature levels while cooling to room temperature are given in Table I.

TABLE I

| Temp. ° F. | Viscosity*, cps. |
|---|---|
| 120 | 560 |
| 110 | 720 |
| 100 | 940 |
| 77 | 1820 |

*Determined by LVF Brookfield Synchro-Lectric Viscometer (Mfd. by Brookfield Engineering Labs., Stanghton, Mass.) using Spindle No. 3 at 30 RPM.

The density of the prepared adhesive as measured at 77° F. was 9.83 lb./gal. as compared with a theoretical value of 9.80 lb./gal. for an aqueous adhesive containing 30 percent total solids. The pH of the aqueous adhesive was 5.75.

Rheology properties of the adhesive were determined by "draw-down" bar technique. This involved preparing a sample of the same composition in the manner aforedescribed, applying such sample to a paper surface, and rapidly drawing (10 feet/sec.) the sample across the paper surface by means of a Meyer rod (⅜ inch diameter rod with 2 mil diameter wire spirally wound thereabout) to produce a wet film of adhesive having a thickness of about 1 mil. Observation of the films produced by this technique indicated that the adhesive was not dilatant at shear rates in the range of $10^2$ to at least about $10^4$ sec.$^{-1}$ in the 77° to 120° F. temperature range. Dilatant flow is evidenced by a non-uniform film surface, e.g., striations, whereas non-dilatant flow is evidence by a smooth film surface. Results thereof showed that the adhesive was not dilatant at shear rates in the range of $10^2$ to at least about $10^4$ sec.$^{-1}$ in the 77° to 120° F. temperature range.

EXAMPLE 2

A quart sample of adhesive was prepared using a polyvinyl alcohol dry blend of the same composition employed in Example 1 and ASP 600 clay having a higher pH value (pH = 4.6) than that employed in Example 1. The procedure of Example 1 was followed to produce an aqueous adhesive of 30 percent solids content.

Figure 2:
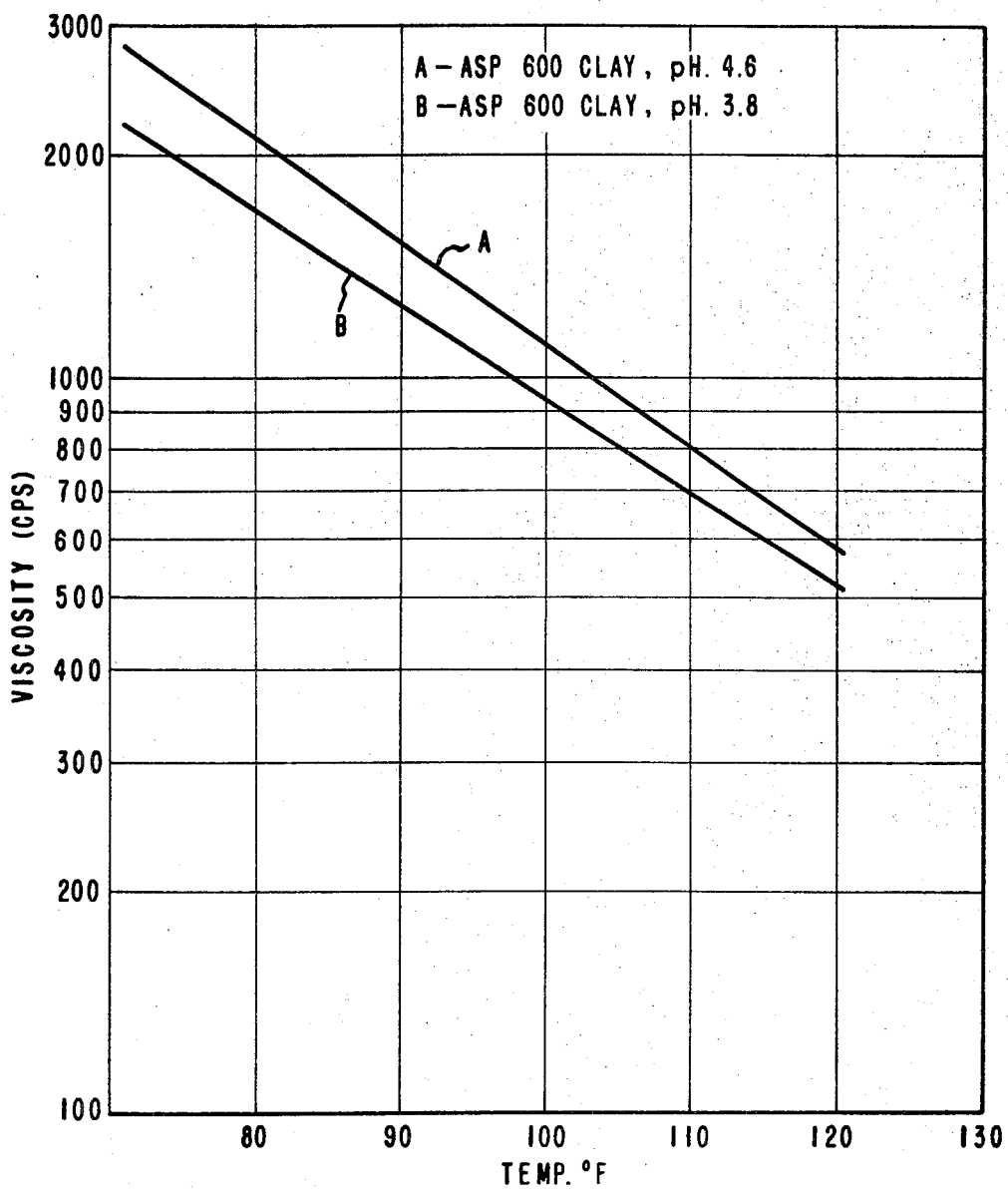
FIG. 2 is a logarithmic plot of viscosity-temperature measurements for adhesives of the invention with clay pH as a parameter.

The results of "draw-down" bar measurements on an adhesive sample of the same composition of Example 1 except that the 4.6 pH clay above was used were comparable to those obtained with the adhesive of Example 1 wherein a lower pH clay was employed. A visual comparison of the viscosity-temperature relationship of the adhesives of Examples 1 and 2 with clay pH as a parameter is depicted in FIG. 2 of the drawings.

EXAMPLE 3

A number of samples of polyvinyl alcohol adhesives were prepared with total solids contents of 30 percent each. In each sample the solids consisted essentially of 30 parts by weight dry blend and 70 parts by weight ASP 600 clay (pH = 3.8). The dry blends had substantially the same composition as described in Example 1 with the exception that fully hydrolyzed polyvinyl alcohol was used having viscometric properties as shown in Table II.

TABLE II

| Sample | Viscosity* |
|---|---|
| A | 30 |
| B | 17 |
| C | 13 |

*Viscosity in centipoises of a 4% aqueous solution at 20° C., determined by Hoeppler falling ball method.

Rheology properties of these samples were investigated by making capillary viscometric measurements thereon at shear rates up to about $10^4$ sec.$^{-1}$. The results of these measurements are visually depicted in the log-log plot of FIG. 1 of the drawings. It is clear from this plot that dilatant flow, i.e., increasing viscosity at increasing shear rate, is experienced by Samples A and B at shear rates of less than $10^3$ sec.$^{-1}$. In contrast thereto, Sample C experiences no dilatant flow at shear rates exceeding $10^4$ sec.$^{-1}$.

EXAMPLE 4

A number of formulations were prepared in accordance with the invention as well as in accordance with the prior art for purposes of evaluation and comparison. The compositions of these formulations are set forth in Table III.

TABLE III

|  | A | B | C |
|---|---|---|---|
| Polyvinyl Alcohol, 13 cps | 68.0 g | 74.8 | — |
| Polyvinyl Alcohol, 17 cps | — | — | 68.0 g |
| ASP–600 Clay | 168 g | 185 g | 168 g |
| Boric Acid (BA) | 3.77 g | 4.10 g | 3.77 g |
| Hexamethylenetetramine (HMTA) | 0.23 g | 0.25 g | 0.23 g |
| Water | 560.0 g | 536.0 g | 560.0 g |
| Solids, % | 30 | 33 | 30 |
| BA/PVA, % | 5.5 | 5.5 | 5.5 |
| HMTA/BA, % | 6.0 | 6.0 | 6.0 |

TABLE IV

| 120° F. | A | B | C |
|---|---|---|---|
| Visc., cps | 600 | 1400 | 1060 |
| pH | 5.62 | 5.63 | 5.53 |
| Wet Tack, g/in²* | 50 | 120 | 90 |
| Bonding Speed, sec.* | 10–15 | 10–15 | 5–10 |
| Flow Properties | no dilatancy | slight dilatancy | no dilatancy |

| 75° F. | A | B | C |
|---|---|---|---|
| Visc., cps | 1480 | 5400 | 3800 |
| pH | 5.49 | 5.77 | 5.57 |
| Wet Tack, g/in²* | 60 | 105 | 85 |
| Bonding Speed, sec.* | 5–10 | 15–20 | 25–30 |
| Flow Properties | medium dilatancy | severe dilatancy | severe dilatancy |

*46 lb. Kraft Paper

Evaluation results of the formulations of Table III are shown in Table IV.

We claim:

1. A dry blend adapted to form with water an adhesive characterized by pseudoplastic flow at shear rates of $10^2$ to at least $10^4$ sec.$^{-1}$, said dry blend comprising water-soluble polyvinyl alcohol characterized by a degree of hydrolysis in the range of about 85 to 100 percent and by a 4 percent aqueous solution viscosity at 20° C. in the range of about 9 to 16 centipoises and a water-soluble boron compound from an amount effective to improve wet tack of said adhesive to an amount less than that at which gelling occurs.

2. A dry blend according to claim 1 wherein said boron compound is boric acid.

3. A dry blend according to claim 2 including a member of the group consisting of hexamethylenetetramine, triethylenediamine and mixtures thereof, from an amount effective to improve quick tack of said adhesive to an amount less than that at which gelling occurs.

4. A dry blend according to claim 3 wherein the amount of said boric acid is in the range of 1 to 7 percent by weight of said polyvinyl alcohol and the amount of said group member is in the range of 0.7 to 12 percent by weight of said boric acid.

5. A dry blend according to claim 3 wherein the amount of said boric acid is in the range of 2 to 6 percent by weight of said polyvinyl alcohol and the amount of said group member is in the range of 3 to 7 percent by weight of said boric acid.

6. A dry blend according to claim 3 wherein the amount of said boric acid is about 5.5 percent by weight of said polyvinyl alcohol and said group member is hexamethylenetetramine in an amount of about 6 percent by weight of said boric acid.

7. A dry blend according to claim 6 wherein said polyvinyl alcohol is characterized by a 4 percent aqueous solution viscosity at 20° C. between 12 and 14 centipoises.

8. A polyvinyl alcohol adhesive comprising an aqueous solution of the blend of claim 1.

9. A polyvinyl alcohol adhesive comprising an aqueous solution of the blend of claim 3.

10. A polyvinyl alcohol adhesive comprising an aqueous solution of the blend of claim 4, said polyvinyl alcohol comprising about 4 to 20 percent by weight of said solution.

11. An adhesive according to claim 8 including clay filler in an amount compatible with pseudoplastic flow of the adhesive.

12. An adhesive according to claim 9 including a clay filler in an amount equal to 20 to 700 percent by weight of said polyvinyl alcohol.

13. An adhesive according to claim 10 including a clay filler in an amount equal to 20 to 700 percent by weight of said polyvinyl alcohol.

14. An adhesive according to claim 10 including a clay filler in an amount equal to 200 to 400 percent by weight of said polyvinyl alcohol.

* * * * *